(12) United States Patent
Plumadore

(10) Patent No.: US 6,936,376 B2
(45) Date of Patent: Aug. 30, 2005

(54) NON-INTERRUPTIBLE BATTERY CHANGING SYSTEM

(75) Inventor: John David Plumadore, Chester, VT (US)

(73) Assignee: Vermont Medical, Inc., Bellows Falls, VT (US)

( * ) Notice: Subject to any disclaimer, the term of this patent is extended or adjusted under 35 U.S.C. 154(b) by 352 days.

(21) Appl. No.: 10/094,022

(22) Filed: Mar. 7, 2002

(65) Prior Publication Data

US 2003/0170532 A1 Sep. 11, 2003

(51) Int. Cl.⁷ .............................................. H01M 2/10
(52) U.S. Cl. ......................... 429/96; 429/99; 439/500
(58) Field of Search .................... 429/96–100, 123; 439/500

(56) References Cited

U.S. PATENT DOCUMENTS 4,731,306 A * 3/1988 Dumbser ................. 429/98
5,369,802 A * 11/1994 Murray ................... 455/351
5,863,218 A * 1/1999 Quat et al. .............. 439/500
6,045,398 A * 4/2000 Narita et al. ............ 439/500

* cited by examiner

Primary Examiner—Jonathan Crepeau
(74) Attorney, Agent, or Firm—Stephen G. Matzuk

(57) ABSTRACT

A battery changing system having a battery chamber housing a first battery connected to a circuit, and receives a second, replacement battery which becomes connected to the circuit and displaces the first battery from the battery chamber as the second battery is being inserted, maintaining continuity of power to the circuit. Embodiments include a system which displaces the battery from the same side or opening in which the replacement battery is inserted, and a system which displaces the battery from another opening in the battery chamber.

11 Claims, 3 Drawing Sheets

NON-INTERRUPTIBLE BATTERY CHANGING SYSTEM

FIELD OF THE INVENTION

This invention battery power systems adapted to continuously power a connected system for uninterrupted service even as the batteries are changed.

BACKGROUND OF THE INVENTION

There have been other non-interruptible systems developed, which use either a separate battery or capacitor to operate the system while the batteries are being changed. These systems work, they are either awkward or somewhat limited in use for use with high current draw systems.

The most common non-interruptible battery exchange system in use today uses a high capacity capacitor which when charged will operate the system for the time it takes to change the battery. The problem is that these capacitors have limited storage capability, and therefore are limited in use with high draw system. Items such as computers (laptops) usually go into a sleep mode when this function is used to minimize the current draw.

Another technique is to use a secondary battery to perform the function of the capacitor. This is more functional for high current draw applications, and can take several variations. One approach is to us a separate battery pack, which is temporally plugged into the system while the batteries are exchanged. This is awkward since it is necessary to have usually specially designed battery pack available to accomplish the interchange. In systems which have a separate battery packs it is also common to supply two input jacks so that packs can be interchanged without interruption.

Another common battery system uses a rechargeable battery, which is maintained internal to the system. This is usually lower in capacity than the main battery. The system maintains charge on the battery, which is capable of running the system for a short period of time while the main battery is changed. When the charged battery is inserted some of the current is used to recharge and maintain this secondary internal battery.

SUMMARY OF THE INVENTION

This invention receives an encased battery pack into a battery chamber which can be exchanged or replaced with another identical battery pack without interrupting the current to the system connected to electrical circuit loads, e.g. a battery operated video monitor system in which the battery supplied power to the LCD monitor as well as a video camera and an illumination system. The combination of all three load components resulted in a current draw to be high 750 ma to 1000 ma depending of the functions being used. The system according to the present invention is compact and light in weight so that using the more standard techniques of capacitors or secondary batteries unnecessary.

The preferred embodiment of the invention solved the above problems by allow sliding the battery pack in from both sides of the monitor case. Once the battery is fully inserted it is flush with the outside of the case. When the battery is low another battery is inserted from the opposite side. It first makes contact the circuit and then pushes the discharged battery through so it protrudes from the other side of the case where it can easily be removed.

This slide through feature has proven to be very convenient to the user since it is not necessary to fumble with covers or doors to change the batteries, just simple insertion into the side of the unit. Because the act of inserting a new battery pushes the discharged battery through exposing it for easy removal there is no need for covers or devices to remove the discharged battery making it especially easy to use.

To keep the charged battery from trying to charge the discharged battery each battery feeds the circuit though a diode. This makes it possible to leave the discharged battery in place without losing any of the capability of the fresh fully charged battery. This arrangement also makes it possible to operate the system on two batteries, which will provide twice the operational time as a single battery.

BRIEF DESCRIPTION OF THE DRAWING

These and further features of the present invention will be better understood by reading the following Detailed Description together with the Drawing, wherein.

DETAILED DESCRIPTION OF THE INVENTION

The system chosen for the initial embodiment for of this invention was a slide through design, which was ideal since the unit was designed to be hand held, and access to both sides of the system was practical.

Figure 1:
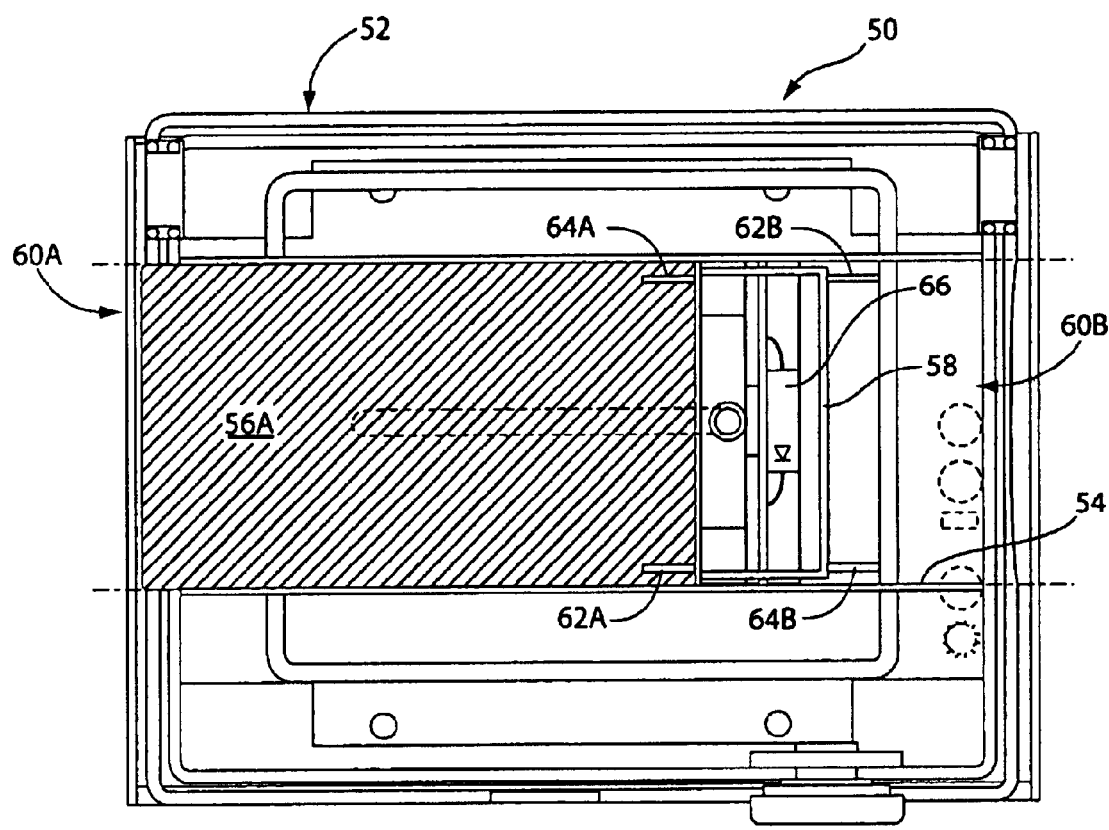
FIG. 1 is a plan view of an equipment having confronting batteries accessible from opposite sides of the equipment via a tunnel battery chamber.

As shown in the embodiment 50 in FIG. 1, the equipment 52 housing has a battery tunnel 54 as a battery chamber to receive batteries, e.g. battery 56 therein to be received by and connected to a battery connector 58. The first battery 56 is received through a tunnel opening 60A on one side of the equipment 52. The battery connector 58 is retained within the tunnel 54 and slidable therein to permit the tail end of the battery 56 to be included within the equipment 52 housing. The battery connector 58 includes connectors positive and negative connectors 62A and 64A for mating with connections at the head end of the first battery, and positive and negative connectors 62B and 64B for mating with connections at the head end of the second battery (not shown here) which electrically connect to and mechanically retain the corresponding batteries. The batteries are typically connected to the equipment load(s) via series diodes, e.g. 66, which prevent energy from a charged battery from flowing into a discharged battery.

Figure 2A:
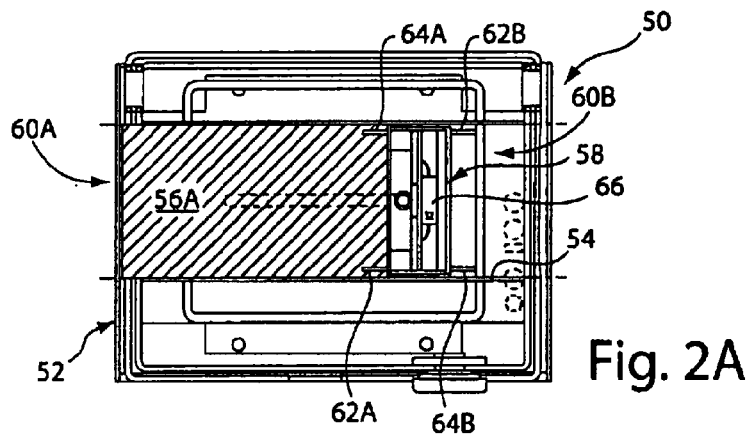
FIG. 2A–2D is a sequence of plan views showing the insertion of a secondary (charged) replacement battery and removal of the first (discharged) battery.
Figure 2B:
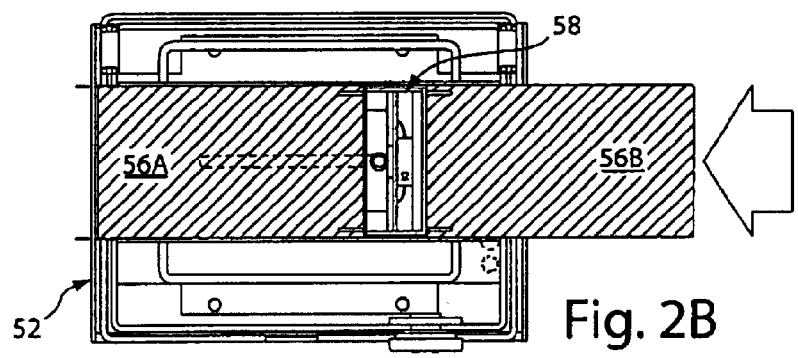
Figure 2C:
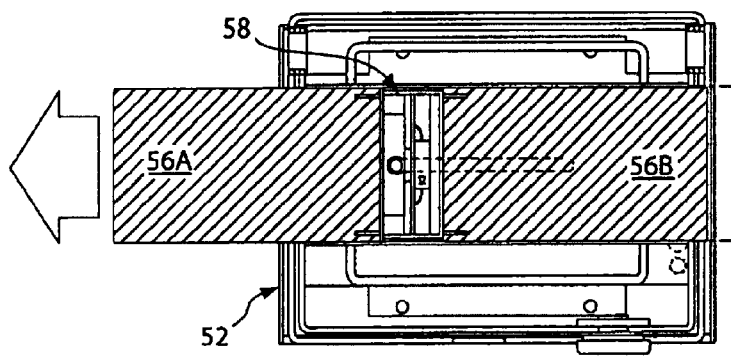
Figure 2D:
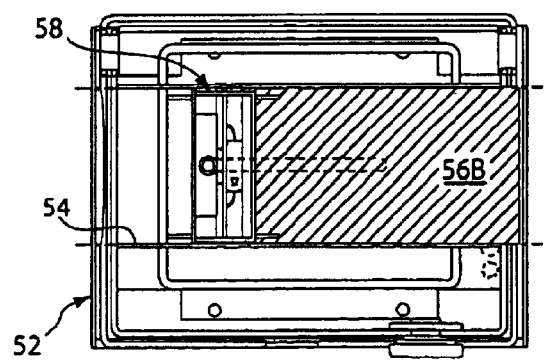

A sequence of drawings, FIGS. 2A–2D show typical operation of the embodiment 50 of FIG. 1. The first battery 56A is fully received into the battery chamber tunnel 54, ready to receive a replacement battery. In FIG. 2B, the replacement (second) battery is inserted into the tunnel opening (60B) and is received by battery connector 58. The replacement battery, in FIG. 2C, is fully inserted into the battery tunnel 54, moving the battery connector 58 and displacing the first battery 56A such that its tail end is extending from the equipment 52 housing and accessible. If both batteries 56A and 56B are charged, the equipment 52 may be operated by both batteries in positions illustrated in FIGS. 2B, 2C and any intermediate position. If the battery 56A is discharged, it may be removed as illustrated in FIG. 2D by unplugging it from the connector 58 and removing it from the tunnel 54.

Figure 3A:
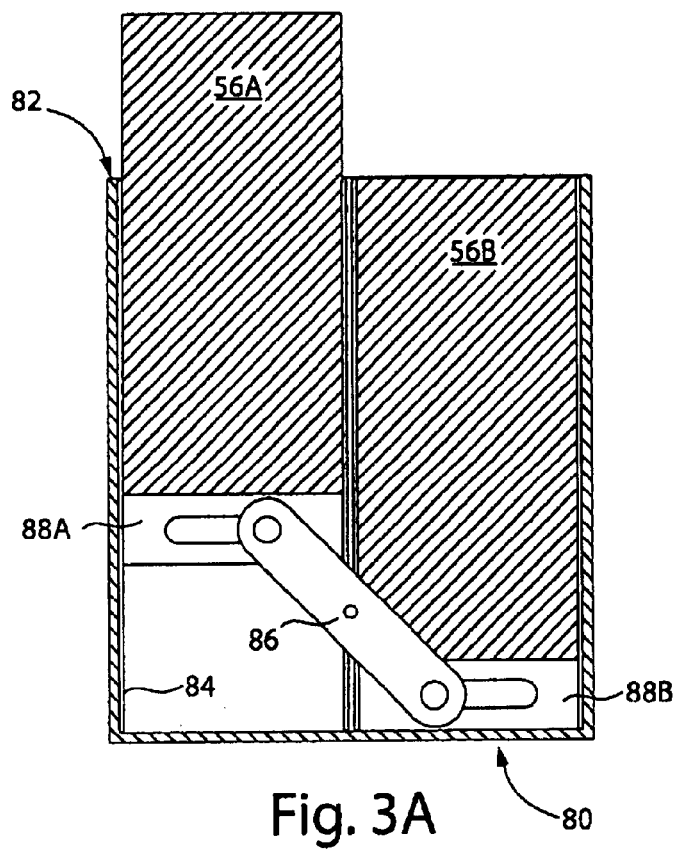
FIGS. 3A and 3B are elevational views of an alternate embodiment of the present invention having parallel disposed first and second batteries insertible and removable from a battery chamber opening on the same side of the equipment.
Figure 3B:
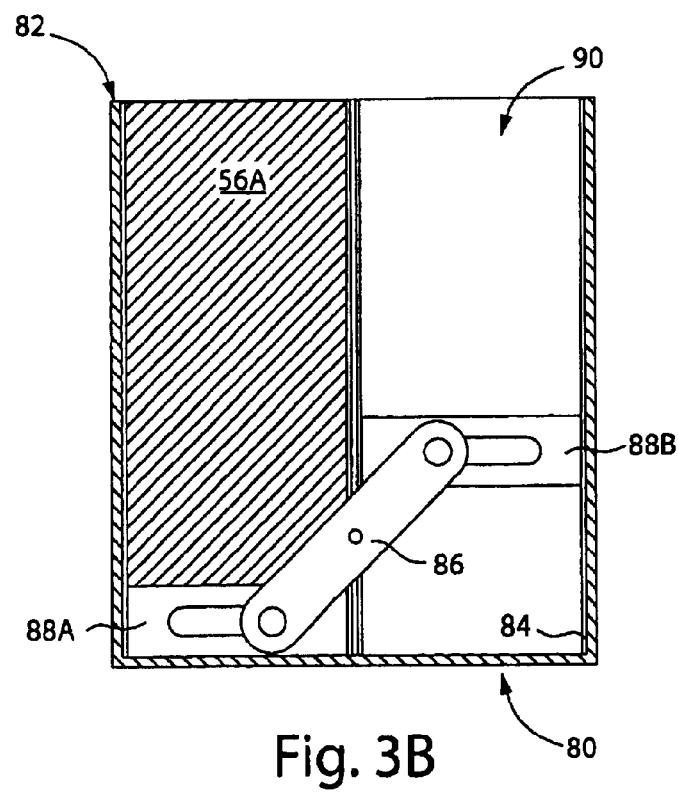

An alternative design 80 such as illustrated in FIG. 3A and 3B, which would prove attractive for some systems, would be where the batteries are inserted from the same direction. Such a system might prove use in a medical device, where non-interrupted power would be critical, yet the device would normally sit beside the patient on a table as an example. Another reason for this type of arrangement would be where the physical size of the unit made the slide-though tunnel design impractical. In such a system inserting the charged battery will cause the discharged battery to be ejected from the equipment unit 82 on the same side, either behind it or along side it. This is accomplished by a pivoting lever arm 86 (a seesaw type arrangement). In FIG. 3A, the second battery 56B is fully received within a battery chamber 84, having a single opening 90, and seated on a battery contact block 88B which electrically connects to the battery 56B and mechanically retains it. A (recharged) first battery 56A is inserted into the battery chamber 84 along side the second battery 56B and is seated on a battery contact block 88A, but not fully seated within the battery chamber 84. Battery connectors 88A and 88B are movable in the directions that their respective batteries are inserted (and removable), and are interconnected by the pivoting lever 86, such that as the first battery 56A is fully seated into the battery chamber 84, the lever 86 acts to urge the battery connector 88B and thus the battery 56B at least partially out from the battery chamber 84, where it may be removed as illustrated in FIG. 3B. The battery connectors 88A and 88B each include electrical connections to the equipment 82 loads and devices, (e.g. diode(s) 66) to restrict energy from flowing into discharged batteries from charged batteries.

Because the movement of one battery causes the other to move (in the embodiments shown) it is also possible to develop locking devices bases on the position of the battery. While the initial embodiment relies on the spring-loaded contacts to retain the battery in use, some electrode configurations might make that impractical. Other embodiments will include cam locking systems which will lock the battery when in the operating position, or when the other battery is removed. These would release when the new battery is inserted or when moved to the removal position. Such a mechanical locking mechanism based on battery placement or the presence of two batteries are within the scope of this invention. Other battery retaining and/or ejecting mechanisms are within the scope of this invention.

Moreover, although the system in which this invention was first employed used lithium ion 7.5 volt 1500 ma batteries of the type commonly found in camcorders, the present invention however can be employed in other battery configurations and types. The further alternate embodiments of the systems according to the present invention do require contact for the battery to be on the same side or end of the battery.

It is also within the scope of this invention to use a secondary battery pack in this design. In such an embodiment, a conventional double ended batteries (as an example) would be loaded into a carrier, which would present connection contacts on the same end of the battery pack, which carrier would then be inserted into the operating unit. Thus the battery carrier would provide the single end connection requirement. Further alternate embodiments include additional batteries simultaneously received through an enlarged or extended battery chamber, wherein the additional charged and/or replacement batteries are connected via series diodes or equivalent electrical circuitry to restrict electrical flow into a discharged battery. Further embodiments include systems which receive electrical flow from both the first and subsequent replacement batteries simultaneously when the first battery is not removed from the battery chamber or disconnected from its circuit.

These and further modifications, substitutions and embodiments as made by one of ordinary skill in the art are within the scope of the present invention, which is not to be limited except by the claims which follow.

What is claimed is:

1. A non-interruptible battery changing system, comprising:
    a battery chamber for movably receiving a plurality of batteries;
    battery connector having a member to seat a first battery within said battery chamber and to receive a second battery into said battery chamber, said battery connector comprising a movable element movable within said battery chamber which urges said first battery from said battery chamber as said second battery is received into said battery chamber, said battery connector including a circuit providing a continuous potential from at least one of said first and said second battery.

2. The non-interruptible battery changing system of claim 1, wherein said battery chamber is dimensioned to allow the insertion of said second battery into said battery chamber to cause said first battery to emerge from said battery chamber to permit removal.

3. The non-interruptible battery changing system of claim 1, wherein said circuit includes a diode to prevent the charge battery from recharging the discharged battery.

4. The non-interruptible battery changing system of claim 1, wherein
    each said first and said second battery includes electrical connections substantially near a head end,
    said battery chamber comprises a tunnel into which said first and said second battery are placed head-to-head serially in a single line and slide though said tunnel, and
    said first battery head and said second battery head are separated by and connected to said battery connector, said battery connector being movable within said tunnel.

5. The non-interruptible battery changing system of claim 4, wherein
    said battery connector has a width and each of said first and said second battery have a length measured from head to tail,
    said tunnel has a length less than the total length of said first and said second battery and said connector width, such that the insertion of said second battery into said tunnel causes at least a portion of said first battery to emerge from said battery chamber tunnel.

6. The non-interruptible battery changing system of claim 1, wherein
    said battery chamber is dimensioned to receive a plurality of batteries, and
    said battery connector comprises a lever to receive said first battery within said battery chamber and urge said first battery from said battery chamber along a first direction when said second battery is inserted therein in a second direction, said first direction being different.

7. The non-interruptible battery changing system of claim 6, wherein said first and said second direction are opposite.

8. The non-interruptible battery changing system of claim 7, wherein said first and said second batteries are received into said battery chamber in a head-by-head, tail-by-tail arrangement.

9. The non-interruptible battery changing system of claim 8, wherein said first and said second batteries have electrical connections substantially at the respective said head end.

10. The non-interruptible battery changing system of claim 8, wherein said battery chamber and said battery connector are dimensioned so as to cause the insertion of said second battery to cause the tail of said first battery to emerge from said battery chamber.

11. The non-interruptible battery changing system of claim 1 further including a battery carrier adapted to receive at least one battery cell, wherein the battery cells are first placed in said battery carrier cells before being inserted into said battery chamber.

* * * * *